United States Patent

Cui et al.

(10) Patent No.: US 9,031,117 B2
(45) Date of Patent: May 12, 2015

(54) METHODS AND APPARATUS FOR HANDLING FINGERS WITH LARGE DELAY SPREAD THROUGH UTILITY OPTIMIZATION

(71) Applicant: QUALCOMM Incorporated, San Diego, CA (US)

(72) Inventors: Tao Cui, San Mateo, CA (US); Wei Zhang, Santa Clara, CA (US); Guang Xie, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/069,212

(22) Filed: Oct. 31, 2013

(65) Prior Publication Data

US 2014/0161156 A1    Jun. 12, 2014

Related U.S. Application Data (60) Provisional application No. 61/734,317, filed on Dec. 6, 2012.

(51) Int. Cl.
*H04B 1/00* (2006.01)
*H04B 1/7073* (2011.01)
*H04B 1/7117* (2011.01)

(52) U.S. Cl.
CPC .......... *H04B 1/7073* (2013.01); *H04B 1/7117* (2013.01)

(58) Field of Classification Search
CPC .. H04B 1/7093; H04B 1/7117; H04B 1/7073; H04B 1/709; H04B 1/7115; H04B 1/71
USPC ......... 375/148, 130, 147, 140, 316, 346, 347, 375/348
See application file for complete search history.

(56) References Cited

U.S. PATENT DOCUMENTS

| | | | |
|---|---|---|---|
| 6,539,006 B1 | 3/2003 | Taylor | |
| 7,065,129 B2 | 6/2006 | Joshi et al. | |
| 7,106,783 B2 | 9/2006 | Seo et al. | |
| 7,801,085 B1 * | 9/2010 | Chen et al. | 370/335 |
| 8,098,780 B2 | 1/2012 | Shesha et al. | |
| 8,559,569 B1 * | 10/2013 | Zhou et al. | 375/343 |

(Continued)

FOREIGN PATENT DOCUMENTS

| | | |
|---|---|---|
| EP | 0942539 A2 | 9/1999 |
| EP | 1154584 A1 | 11/2001 |
| WO | WO-0205446 A1 | 1/2002 |

OTHER PUBLICATIONS

International Search Report and Written Opinion—PCT/US2013/068058—ISA/EPO—Feb. 17, 2014 11 pages.

*Primary Examiner* — Kenneth Lam
(74) *Attorney, Agent, or Firm* — Arent Fox LLP (57) ABSTRACT

Techniques for handling fingers with large delay spread through utility optimization are described. A first signal may be received, through a finger of a plurality of fingers in a receiver, at a time that is later than a reference time after a reference signal is received by a reference finger of the plurality of fingers. The reference signal may be included in an on-time group corresponding to a cell. The first signal may be included in a late group corresponding to a virtual cell. The first signal and the reference signal may be compared to one another. Based on the comparing, it may be determined whether to wait for additional signals in the late group or process the signals in the on-time group.

28 Claims, 8 Drawing Sheets

(56) References Cited

U.S. PATENT DOCUMENTS

| | | |
|---|---|---|
| 2002/0051486 A1* | 5/2002 | Aue ................................ 375/150 |
| 2003/0022627 A1 | 1/2003 | Fernandez-Corbaton et al. |
| 2003/0133424 A1* | 7/2003 | Liang et al. .................... 370/335 |
| 2003/0224744 A1* | 12/2003 | Sternberg ....................... 455/137 |
| 2004/0004997 A1* | 1/2004 | Boesel et al. .................. 375/148 |
| 2005/0047537 A1* | 3/2005 | Cheng ............................ 375/355 |
| 2005/0255816 A1 | 11/2005 | Francon et al. |
| 2008/0095141 A1* | 4/2008 | Kong et al. .................... 370/345 |
| 2008/0267263 A1* | 10/2008 | Fisher-Jeffes et al. ......... 375/148 |

* cited by examiner

METHODS AND APPARATUS FOR HANDLING FINGERS WITH LARGE DELAY SPREAD THROUGH UTILITY OPTIMIZATION

CLAIM OF PRIORITY UNDER 35 U.S.C. §119

The present application for patent claims priority to Provisional Application No. 61/734,317 entitled "METHODS AND APPARATUS FOR HANDLING FINGERS WITH LARGE DELAY SPREAD THROUGH UTILITY OPTIMIZATION" filed Dec. 6, 2012, and assigned to the assignee hereof and hereby expressly incorporated by reference herein.

BACKGROUND

The present disclosure relates generally to communication systems, and more particularly, to improving handling of fingers with large delay spread through utility optimization.

Wireless communication networks are widely deployed to provide various communication services such as telephony, video, data, messaging, broadcasts, and so on. Such networks, which are usually multiple access (e.g., multipath) networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

A rake receiver is a radio receiver designed to counter the effects of multipath fading. It does this by using several "sub-receivers" called fingers, that is, several correlators each assigned to a different multipath component. The rake receiver is so named because it reminds the function of a garden rake, each finger collecting symbol energy similar to how tines on a rake collect leaves. Rake receivers are common in a wide variety of CDMA and W-CDMA radio devices such as mobile phones and wireless LAN equipment. Each finger may independently decode a multipath component. Multipath components may be delayed copies of an original transmitted wave traveling through a different path (e.g., transmissions from a repeater may be delayed in comparison to transmissions from an originating base station or Node B), each with a different magnitude and time-of-arrival (also referred to as phase) at the receiver. Since each component contains the original information, if the magnitude and time-of-arrival (phase) of each component is computed at the receiver (through a process called channel estimation), then all the components can be added coherently to improve the information reliability.

Cell delay spread is a metric used in system design. The cell delay spread may be used to determine other system designs, such as transmit power control (TPC), turn-around time distribution between firmware (FW) and hardware (HW), length of sample reading for each block processing group (BPG), and/or the like. However, with the widely deployed repeaters, cell delay spreads greater than the maximum value may be seen. Generally, signals from a repeater may be stronger than those received directly from a base station or Node B.

Therefore, improvements in handling fingers with large delay spreads may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication is described. The method may include receiving, through a finger of a plurality of fingers in a receiver, a first signal. The first signal may be received at a time that is later than a reference time after a reference signal is received by a reference finger of the plurality of fingers. The reference signal may be included in an on-time group corresponding to a cell. The method may include including the first signal in a late group corresponding to a virtual cell. The method may include comparing the first signal to the reference signal. The method may include determining, based on the comparing, whether to wait for additional signals in the late group or process the signals in the on-time group.

In an aspect, a non-transitory computer-readable medium for wireless communication comprising code is described. The code, when executed by a processor or processing system included within a user equipment, may cause the user equipment to receive, through a finger of a plurality of fingers in a receiver, a first signal. The first signal may be received at a time that is later than a reference time after a reference signal is received by a reference finger of the plurality of fingers. The reference signal may be included in an on-time group corresponding to a cell. The code, when executed by a processor or processing system included within a user equipment, may cause the user equipment to include the signal in a late group corresponding to a virtual cell. The code, when executed by a processor or processing system included within a user equipment, may cause the user equipment to compare the first signal to the reference signal. The code, when executed by a processor or processing system included within a user equipment, may cause the user equipment to determine, based on the comparison, whether to wait for additional signals in the late group or process the signals in the on-time group.

In an aspect, an apparatus for wireless communication is described. The apparatus may include means for receiving, through a finger of a plurality of fingers in a receiver, a first signal. The first signal may be received at a time that is later than a reference time after a reference signal is received by a reference finger of the plurality of fingers. The reference signal may be included in an on-time group corresponding to a cell. The apparatus may include means for including the first signal in a late group corresponding to a virtual cell. The apparatus may include means for comparing the first signal to the reference signal. The apparatus may include means for determining, based on the comparing, whether to wait for additional signals in the late group or process the signals in the on-time group comparison.

In an aspect, an apparatus for wireless communication is described. The apparatus may include a reception module configured to receive, through a finger of a plurality of fingers in a receiver, a first signal. The first signal may be received at a time that is later than a reference time after a reference signal is received by a reference finger of the plurality of fingers. The reference signal may be included in an on-time group corresponding to a cell. The apparatus may include a downlink signal processing module configured to include the first signal in a late group corresponding to a virtual cell, compare the first signal to the reference signal, and determine, based on the comparison, whether to wait for additional signals in the late group or process the signals in the on-time group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
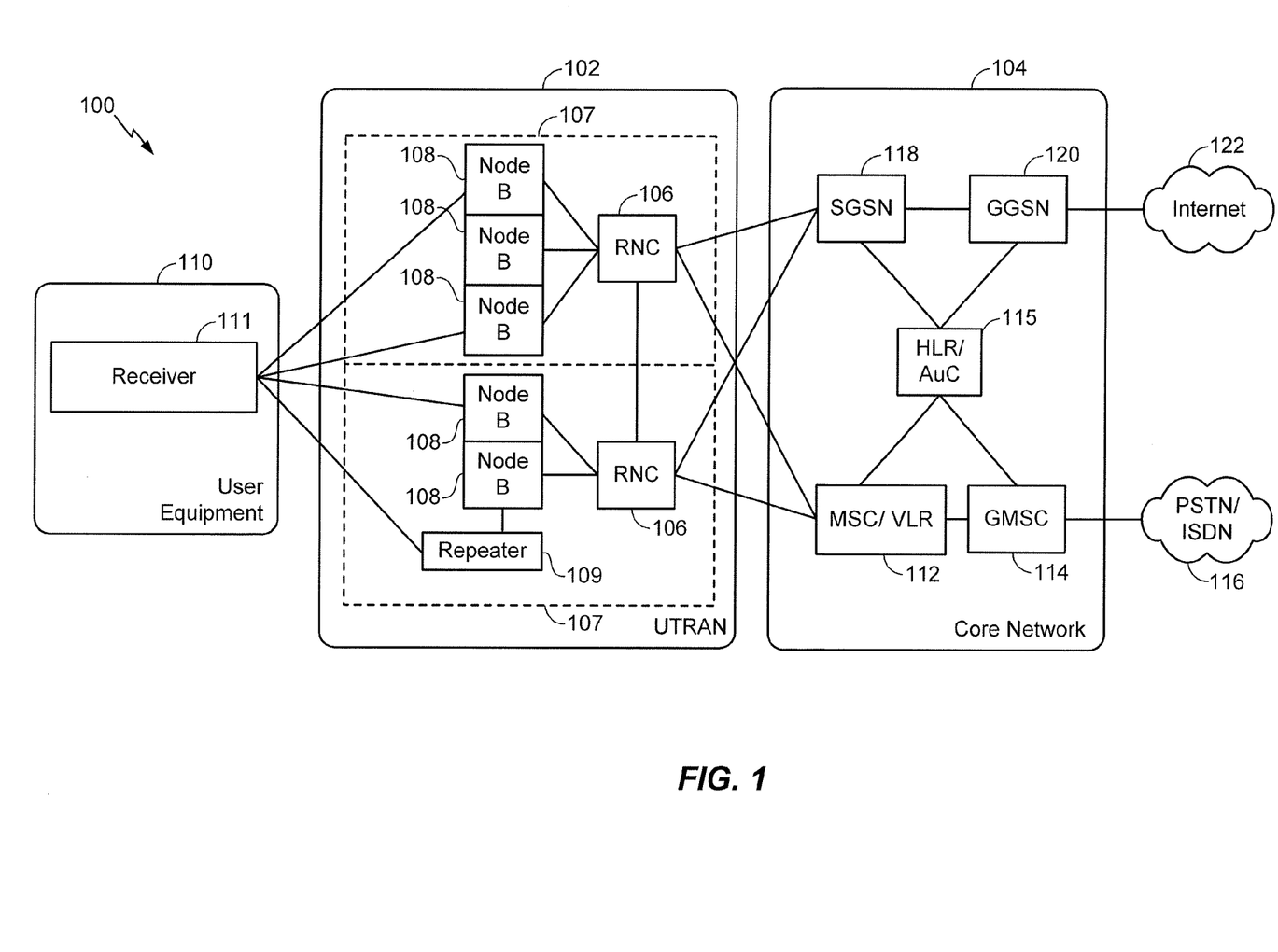
FIG. 1 is a diagram illustrating an example of an access network architecture having aspects configured to handle fingers with large delay spreads through utility optimization according to the present aspects.

By way of example and without limitation, the aspects of the present disclosure illustrated in FIG. 1 are presented with reference to a UMTS system 100 employing a W-CDMA air interface and/or CDMA2000 air interface and having aspects configured to handle fingers with large delay spreads through utility optimization. A UMTS network includes three inter-acting domains: a Core Network (CN) 104, a UMTS Terrestrial Radio Access Network (UTRAN) 102, and User Equipment (UE) 110. In this example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like, using any suitable transport network.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

In an aspect, communications may be received by UE 110 receiver 111, from a Node B 108 directly and/or through a repeater 109 associated with a Node B 108. In such an aspect, repeater 109 may transmit the same signal as Node B 108 but at a delayed time. As such, receiver 111 may receive a first instance of a signal at a first time from the Node B 108 and a second instance of the signal at a second time from the repeater 109.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. The RNSs 107 may include any number of wireless Node Bs. The Node Bs 108 provide wireless access points to a CN 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

The CN 104 interfaces with one or more access networks, such as the UTRAN 102. As shown, the CN 104 is a GSM core network. However, as those skilled in the art will recognize, the various concepts presented throughout this disclosure may be implemented in a RAN, or other suitable access network, to provide UEs with access to types of CNs other than GSM networks.

The CN 104 includes a circuit-switched (CS) domain and a packet-switched (PS) domain. Some of the circuit-switched elements are a Mobile services Switching Centre (MSC) 112, a Visitor location register (VLR), and a Gateway MSC 114. Packet-switched elements include a Serving GPRS Support Node (SGSN) 118 and a Gateway GPRS Support Node (GGSN) 120. Some network elements, like EIR, HLR, VLR and AuC 115 may be shared by both of the circuit-switched and packet-switched domains. In the illustrated example, the CN 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 may also include a VLR that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The CN 104 also supports packet-data services with a serving General Packet Radio Service (GPRS) support node (SGSN) 118 and a gateway GPRS support node (GGSN) 120. GPRS is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UE 110 with packet-based network connectivity. Data packets may be transferred between the GGSN 120 and the UE 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS- CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

Figure 2:
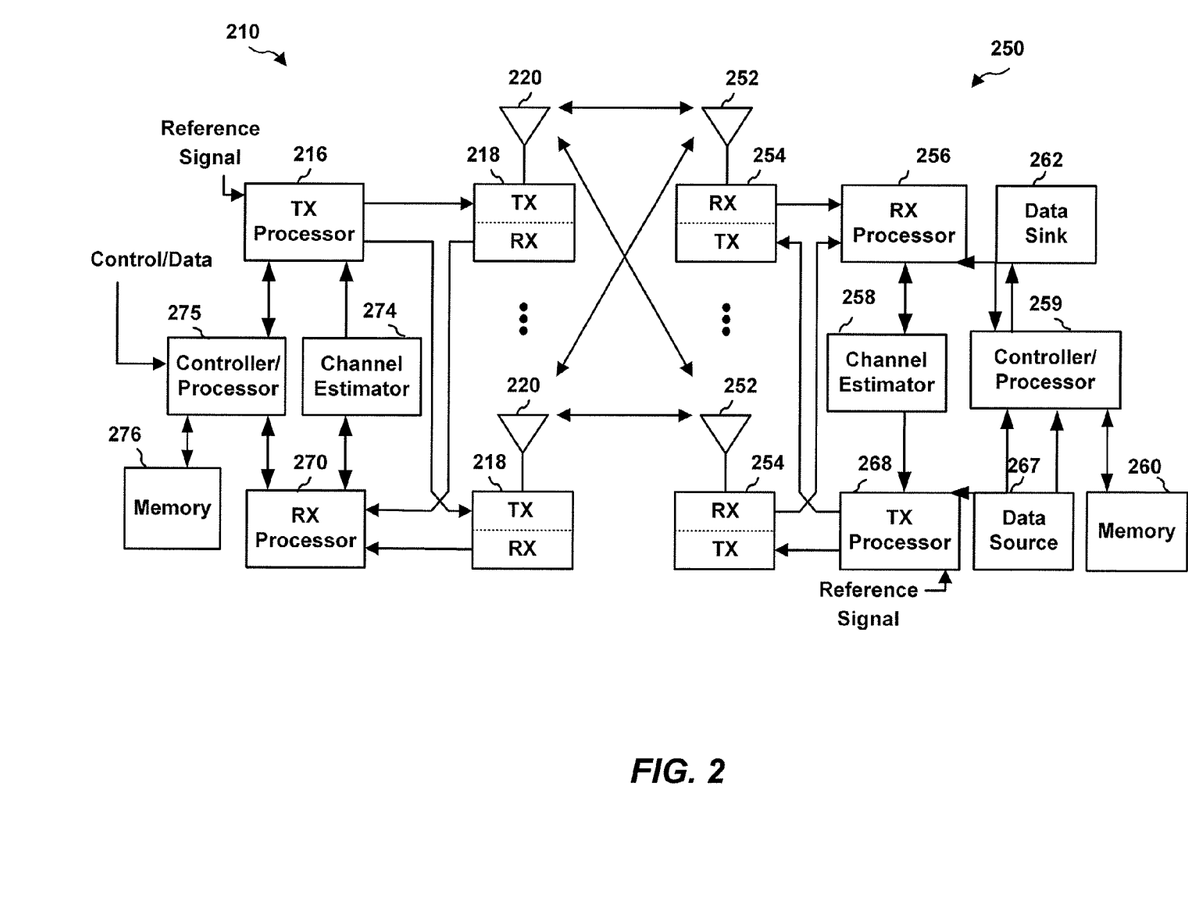
FIG. 2 is a diagram illustrating an example of a network entity and user equipment in an access network having aspects configured to handle fingers with large delay spreads through utility optimization according to the present aspects.

FIG. 2 is a block diagram of a network entity 210 (e.g., Node B, eNode B (also referred to as an eNB), repeater, and/or the like) in communication with a UE 250 in an access network having aspects configured to handle fingers with large delay spreads through utility optimization. In an aspect, UE 250 may be the same as, or similar to, UE 110 of FIG. 1. In an aspect, network entity 210 may be the same as, or similar to, repeater 109 and/or Node B 108 of FIG. 1.

In the DL, upper layer packets from the core network are provided to a controller/processor 275. The controller/processor 275 implements the functionality of the L2 layer. In the DL, the controller/processor 275 provides header compression, ciphering, packet segmentation and reordering, multiplexing between logical and transport channels, and radio resource allocations to the UE 250 based on various priority metrics. The controller/processor 275 is also responsible for HARQ operations, retransmission of lost packets, and signaling to the UE 250.

The transmit (TX) processor 216 implements various signal processing functions for the L1 layer (i.e., physical layer). The signal processing functions includes coding and interleaving to facilitate forward error correction (FEC) at the UE 250 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream is then provided to a different antenna 220 via a separate transmitter 218TX. Each transmitter 218TX modulates an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The RX processor 256 implements various signal processing functions of the L1 layer. The RX processor 256 performs spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the network entity 210. These soft decisions may be based on channel estimates computed by the channel estimator 258. The soft decisions are then decoded and deinterleaved to recover the data and control signals that were originally transmitted by the network entity 210 on the physical channel. The data and control signals are then provided to the controller/processor 259.

The controller/processor 259 implements the L2 layer. The controller/processor can be associated with a memory 260 that stores program codes and data. The memory 260 may be referred to as a computer-readable medium. In the UL, the controller/processor 259 provides demultiplexing between transport and logical channels, packet reassembly, deciphering, header decompression, control signal processing to recover upper layer packets from the core network. The upper layer packets are then provided to a data sink 262, which represents all the protocol layers above the L2 layer. Various control signals may also be provided to the data sink 262 for L3 processing. The controller/processor 259 is also responsible for error detection using an acknowledgement (ACK) and/or negative acknowledgement (NACK) protocol to support HARQ operations.

In the UL, a data source 267 is used to provide upper layer packets to the controller/processor 259. The data source 267 represents all protocol layers above the L2 layer. Similar to the functionality described in connection with the DL transmission by the network entity 210, the controller/processor 259 implements the L2 layer for the user plane and the control plane by providing header compression, ciphering, packet segmentation and reordering, and multiplexing between logical and transport channels based on radio resource allocations by the network entity 210. The controller/processor 259 is also responsible for HARQ operations, retransmission of lost packets, and signaling to the network entity 210.

Channel estimates derived by a channel estimator 258 from a reference signal or feedback transmitted by the network entity 210 may be used by the TX processor 268 to select the appropriate coding and modulation schemes, and to facilitate spatial processing. The spatial streams generated by the TX processor 268 are provided to different antenna 252 via separate transmitters 254TX. Each transmitter 254TX modulates an RF carrier with a respective spatial stream for transmission.

The UL transmission is processed at the network entity 210 in a manner similar to that described in connection with the receiver function at the UE 250. Each receiver 218RX receives a signal through its respective antenna 220. Each receiver 218RX recovers information modulated onto an RF carrier and provides the information to a RX processor 270. The RX processor 270 may implement the L1 layer.

The controller/processor 275 implements the L2 layer. The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover upper layer packets from the UE 250. Upper layer packets from the controller/processor 275 may be provided to the core network. The controller/processor 275 is also responsible for error detection using an ACK and/or NACK protocol to support HARQ operations.

Figure 3:
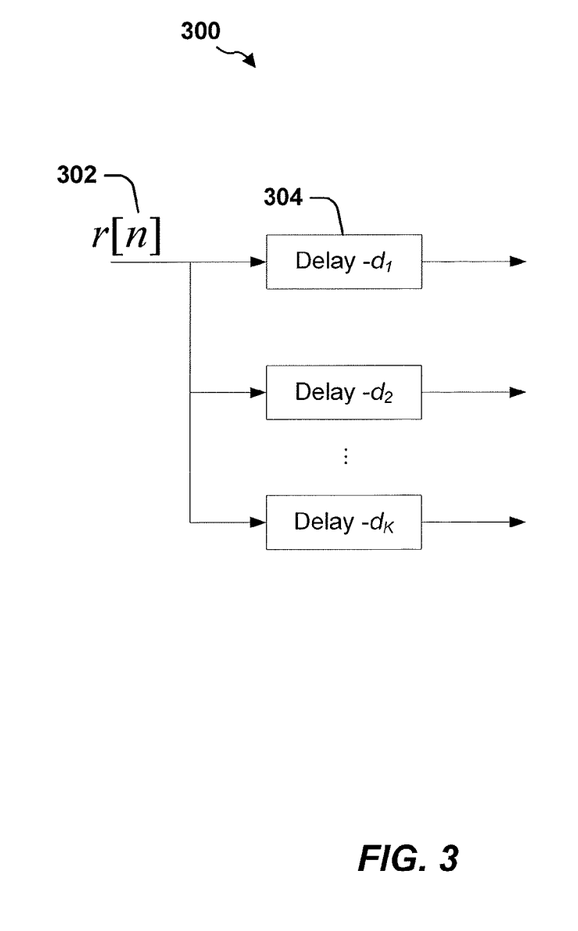
FIG. 3 is an illustration of an example multicarrier receiver having aspects configured to handle fingers with large delay spreads through utility optimization according to the present aspects.

FIG. 3 is a block diagram of a multicarrier receiver 300, which may be located within a user equipment, such as, for example, UE 110 of FIG. 1 and/or UE 250 of FIG. 2. In an aspect, the multicarrier receiver 300 may be the same as, or similar to, receiver 111 within UE 110 of FIG. 1.

Receiver 300 may process a received signal (r[n]) 302 using multiple delay paths 304 (e.g., d1, d2, . . . dk) (e.g., rake fingers). In an aspect, the receiver 300 may use a per cell scrambling seed application programming interface (API), which may not allow for configuring different scrambling codes for fingers from the same cell. Components of signal 302 that are received within a reference time of a reference signal may be processed as a block processing group (BPG). As used herein a reference signal may be an earliest locked finger in a reference cell. A device may use the reference cell until it is removed. In an aspect, any component of signal 302 that may be received and processed through a delay path 304 within the reference time may be associated with an "on-time" group and may be included in a subsequent BPG. In another aspect, any component of signal 302 that may be received and processed through a delay path 304 after the reference time may be associated with a "late" group and may be included in a BPG of a virtual cell (e.g., a late cell).

In an operational aspect, a device may delay processing by one slot when the device determines to use (e.g., process signals associated with) the late cell instead of the on-time cell. In such an aspect, the on-time cell values may be discarded and the late cell may be processed as the reference cell. In another aspect, the total power of fingers in the on-time group may be compared with the total power of the fingers in the late group and the group with the greater total power may be selected as the reference cell. In such an aspect, power levels of fingers in a group that is not selected as the reference cell may be retained for future comparisons. Further discussion of BPG allocation and/or processing is provided with respect to FIGS. 4-8.

Figure 4:
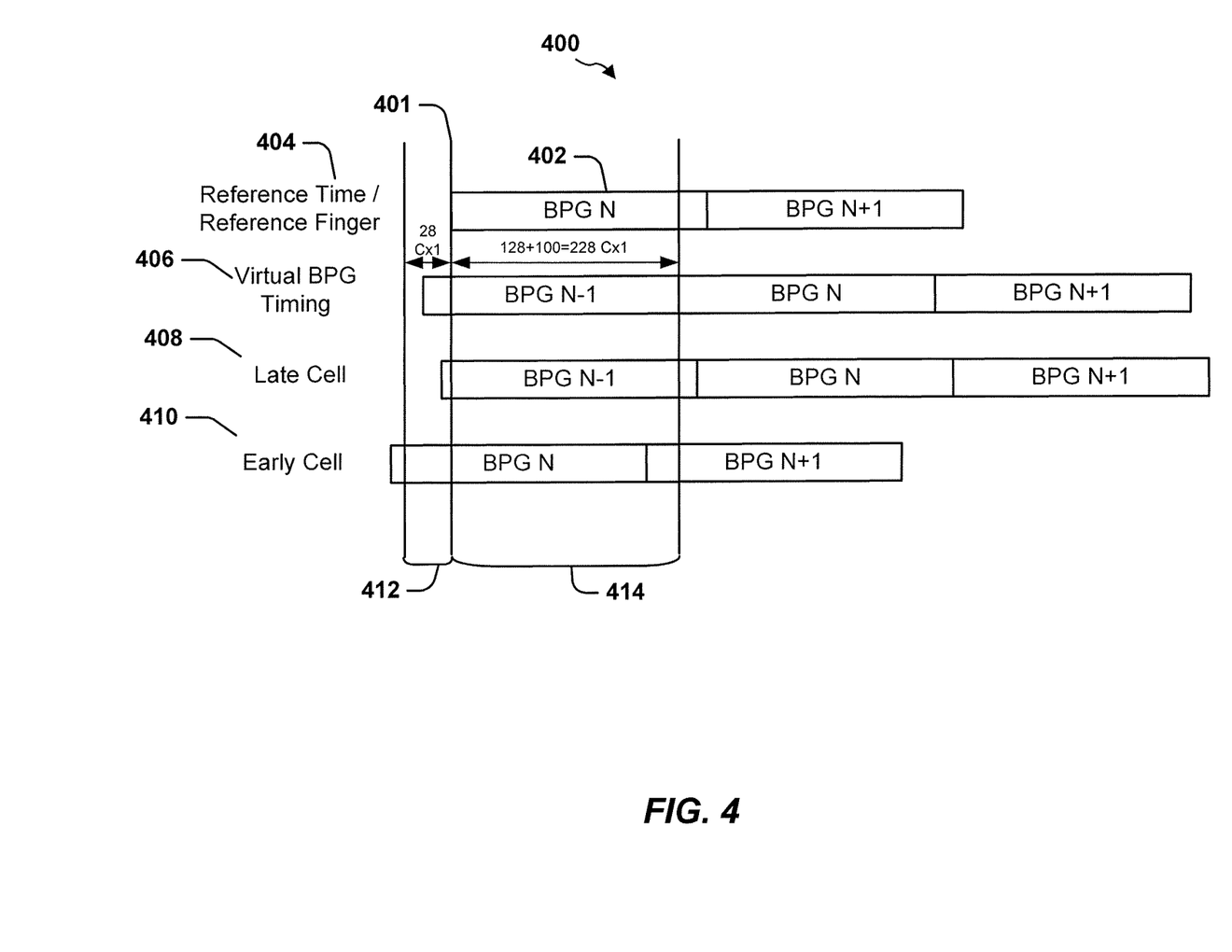
FIG. 4 is a diagram illustrating example timing for various cells with different cell delay spreads, according to the present aspects.

FIG. 4 illustrates a block processing group (BPG) level timing maintenance 400 for a receiver, such as, for example, receiver 300 of FIG. 3.

BPG level timing 400 may be determined based on reception of a reference signal 401. Signals received within a reference time 414 of the reference signal 401 may be included in a first BPG 402 and may be processed as a reference finger 404. In an aspect, the reference time 414 may be defined based a number of samples received. For example, the reference time may be defined as 228 samples (228(Cx1)). In such an aspect, 228 Cx1 may be selected based on 128 Cx1 (which is described for cell power control in 3GPP TS 25.214, which is publicly available) plus 100 Cx1 for a maximum cell delay spread. As such, a late cell 408 may be defined as a cell that includes samples received after the reference time 414.

In another aspect, signals received an early time 412 before the reference signal 401, may be referred to as early cell 410. In such an aspect, the early time 412 may be 28 Cx1 ahead of reference signal 401.

In an operational aspect, a virtual cell 406 may include a BPG boundary described by the reference time 414. In such an aspect, signals received after the reference time 414 may be grouped into the virtual cell and may be used for subsequent comparison with the reference cell. Such a comparison may be used to determine whether the virtual cell will replace the reference cell.

Figure 5:
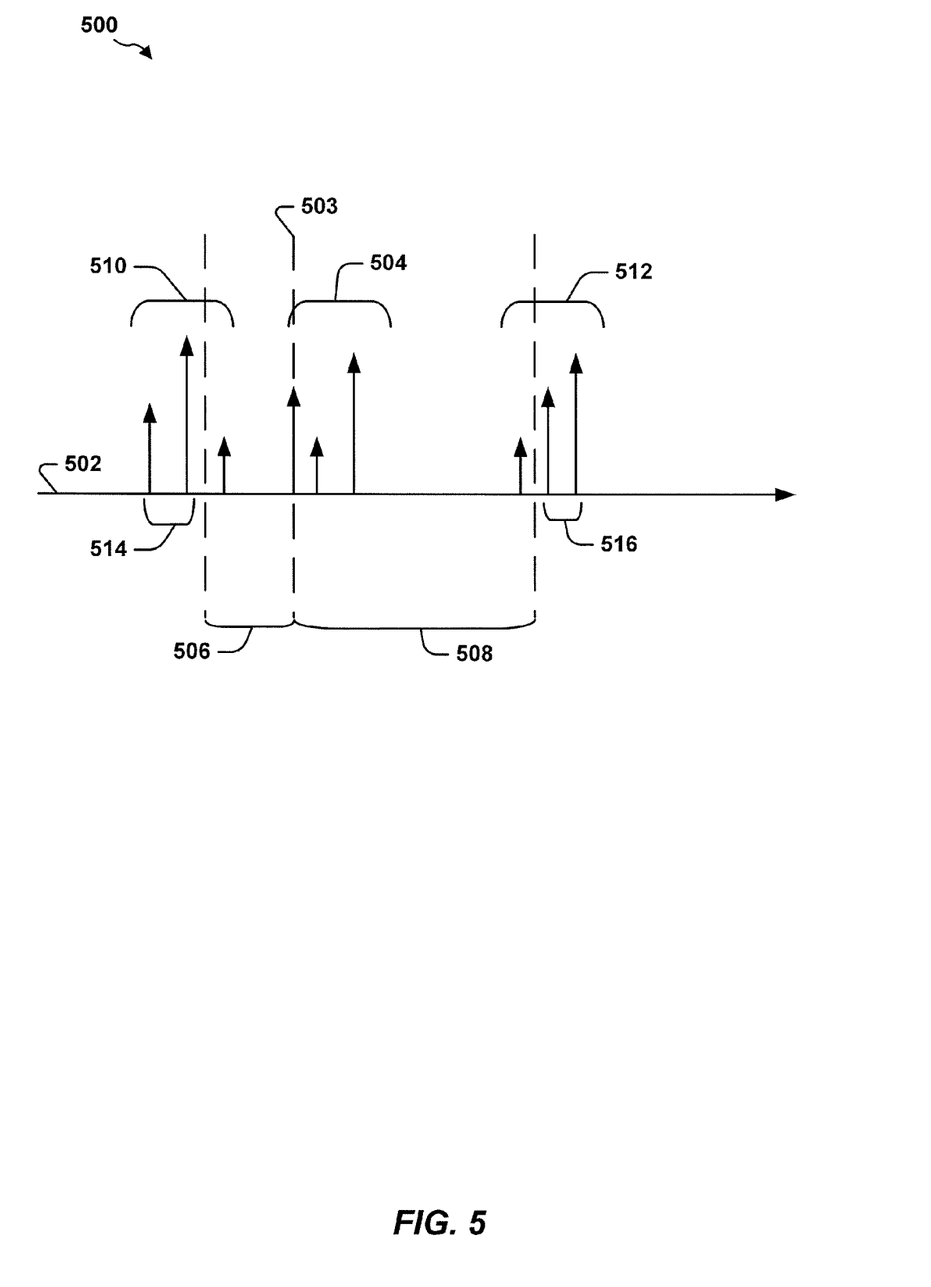
FIG. 5 is a diagram illustrating example reception time of reference signals with respect to cell timing, according to the present aspects.

FIG. 5 illustrates a reception timing 500 of reference signals (e.g., primary scrambling codes (PSCs)) over time 502 received at a receiver such as, for example, receiver 300 of FIG. 3.

A PSC from a reference cell 504 may be received at a reference time 503. Components of signals received within an early time 506 and a reference time 503 of the timing of the reference signal reception may be grouped in a BPG. In the example depicted in FIG. 5, a portion 514 of a signal received from a second cell 510 and a portion 516 of a signal received from a third cell 512 may not be included in the BPG described by the reference signal reception timing 503.

In an operational aspect, signals received after the reference time 508 may be associated with a virtual cell. In an aspect, a cell may be assigned for processing on-time BPGs and a virtual cell may be provided to process late BPGs. For example, in an environment in which a Node B (e.g., Node B 108 of FIG. 1 and/or Node B 210 of FIG. 2) and a repeater (e.g., repeater 109 of FIG. 1) are deployed, the on-time cell may receive signals from the Node B while the late group may receive signals from the repeater. In such an aspect, a cell (e.g., one of 8 potentially available cells) may be allocated to create the virtual cell. In such an aspect, cells may be filled from 0 to 7 of the 8 potentially available cells in order of serving cells, soft handover (SHO) cells, and neighbor cells. As such, a virtual cell may be allocated from 7 to 0 of the 8 potentially available cells. In an aspect, in which all cells are full (e.g., with cells and previously assigned virtual cells), a virtual cell with the least energy may be removed to provide space for the new virtual cell. In another aspect, at initialization, the virtual cells may be ordered according to power and the cells may be filled in power decreasing order.

Figure 6:
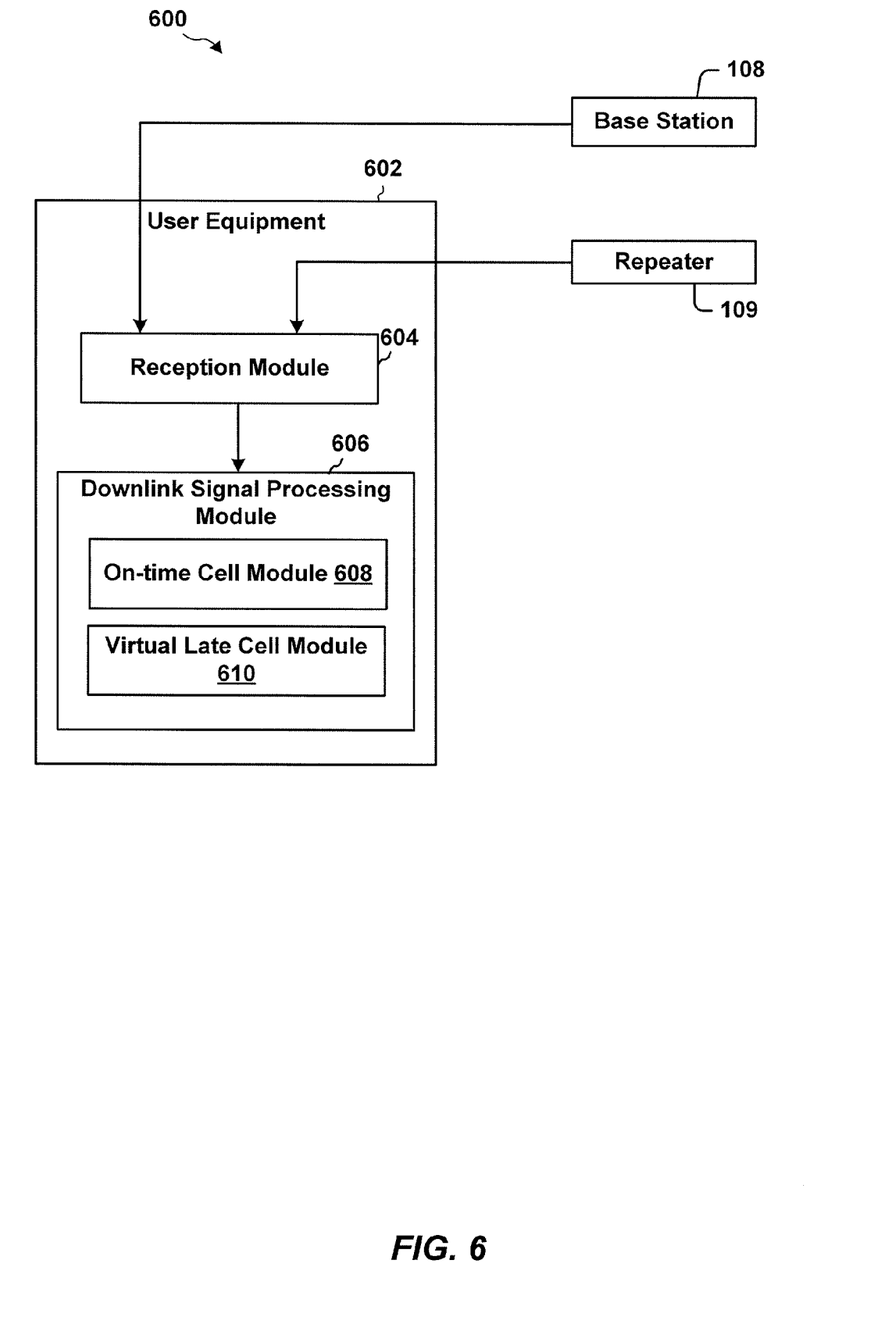
FIG. 6 is a diagram illustrating an example system, including an apparatus (e.g., user equipment) in communication with a base station and a repeater, having aspects configured to handle fingers with large delay spreads through utility optimization according to the present aspects.

FIG. 6 is an example system, including a user equipment (UE) 602 in communication with base station 108 and repeater 109 of FIG. 1, having aspects configured to handle fingers with large delay spreads through utility optimization according to the present aspects. UE 602 may be UE 110 of FIG. 1 and/or UE 250 of FIG. 2. UE 602 includes a reception module 604, a downlink signal processing module 606, on-time cell module 608, and a virtual late cell module 610.

In an aspect, reception module 604, downlink signal processing module 606, on-time cell module 608, and/or virtual late cell module 610 may be hardware components physically included within UE 602. In an aspect reception module 604, downlink signal processing module 606, on-time cell module 608, and/or virtual late cell module 610 may be software components (e.g., software modules), such that the functionality described with respect to each of the modules may be performed by a specially-configured computer, processor (or group of processors), and/or a processing system (e.g., processor 804 of FIG. 8), included within UE 602, executing one or more of the modules. Further, and in an aspect where the modules of UE 602 are software modules, the software modules may be downloaded to UE 602 from, e.g., a server or other network entity, retrieved from a memory or other data store internal to UE 602 (e.g., computer-readable medium 806 of FIG. 8), and/or accessed via an external computer-readable medium (e.g., a CD-ROM, flash drive, and/or the like).

UE 602 includes reception module 604 configured to receive a reference signal at a first time from, e.g., base station 108 and/or repeater 109. Reception module 604 also may be configured to receive a signal at a time greater than (e.g., later in time than) a reference time after the first time. More particularly, a reference finger of a plurality of fingers in a receiver associated with reception module 604 (e.g., receiver 300 of FIG. 3), may receive signals. In an aspect, the reference signal may be included in an "on-time" group associated with an on-time cell, such as, e.g., base station 108. In an aspect, the reference signal comprise a primary scrambling code (PSC). In an aspect, the reference time may be 228 Cx1 samples.

Downlink signal processing module 606, on-time cell module 608, and/or virtual late cell module 610, may be configured to determine whether to use (e.g., process) signals from the reference/on-time cell, the virtual/late cell, or both. Such a determination may be based on which cell has a greater power and/or utility.

Downlink signal processing module 606 may perform utility optimization to determine which cell is to be used for processing. If a determination is made by downlink signal processing module 606 to include a signal in the on-time group, on-time cell module 608 may be configured to so include the signal. If a determination is made by downlink signal processing module 606 to include a signal in the late group, virtual late cell module 610 may be configured to so include the signal.

In such an aspect, downlink signal processing module 606 may attempt to optimize call quality (e.g., maximize a utility function (E)). Call quality may be based on block error rate (BLER). The utility may be a function of call quality (E(f (BLER$_{short\ term}$)), where BLER$_{short\ term}$ is the short term BLER within a few slots. In an aspect, BLER$_{short\ term}$ may be used to determine utility, in which case comparing utility is equivalent to comparing average BLER and hence power. In another aspect, the log of BLER$_{short\ term}$ may be used to determine utility, e.g., f(BLER$_{short\ term}$=log(1−BLER$_{short\ term}$). The utility function (E(f(BLER$_{short\ term}$)) may be further optimized as a trade-off between average BLER and variation of short term BLER, such as seen in equation (2).

$$maxE(log(1-BLER_{short\ term})) \approx minE(BLER_{short\ term}) + 0.5var(BLER_{short\ term}) \quad (2)$$

In another aspect, in order to avoid frequent cell switching due to power variation, downlink signal processing module 606 may use a moving average on finger total power in each group, such as provided in equation (1). Downlink signal processing module 606 may compute a variance (s) of total finger power in the on-time cell and the late cell, such as provided in equation (3).

$$s_{avg} = \alpha(P_{avg} - P_{int})^2 + (1-\alpha)s_{avg} \quad (3)$$

In such an aspect, downlink signal processing module 606 may switch cells from the on-time cell to the late cell based on equation (4) and/or may switch from the late cell to the on-time cell based on equation (5).

$$P_{avg}^{on-time} + \beta\sqrt{s_{avg}^{on-time}} < P_{avg}^{late} - \beta\sqrt{s_{avg}^{late}} \quad (4)$$

$$P_{avg}^{on-time} - \beta\sqrt{s_{avg}^{on-time}} > P_{avg}^{late} + \beta\sqrt{s_{avg}^{late}} \quad (5)$$

where β may be chosen to be 0 or 3.

In an operational aspect, a new finger may be added to the corresponding on-time or late group according to the finger position being greater than or less than a reference timing+ 228 Cx1. If there is no late cell and the finger is a new finger, the finger may be placed into a new finger group and its total finger energy may be initialized to zero. In an aspect, the on-time cell may be chosen at initialization. Thereafter, at the end of a set of frames (e.g., 32 frames), downlink signal processing module 606 may switch cells from the on-time cell to the late cell based on equation (4) and/or may switch from the late cell to the on-time cell based on equation (5).

Figure 7:
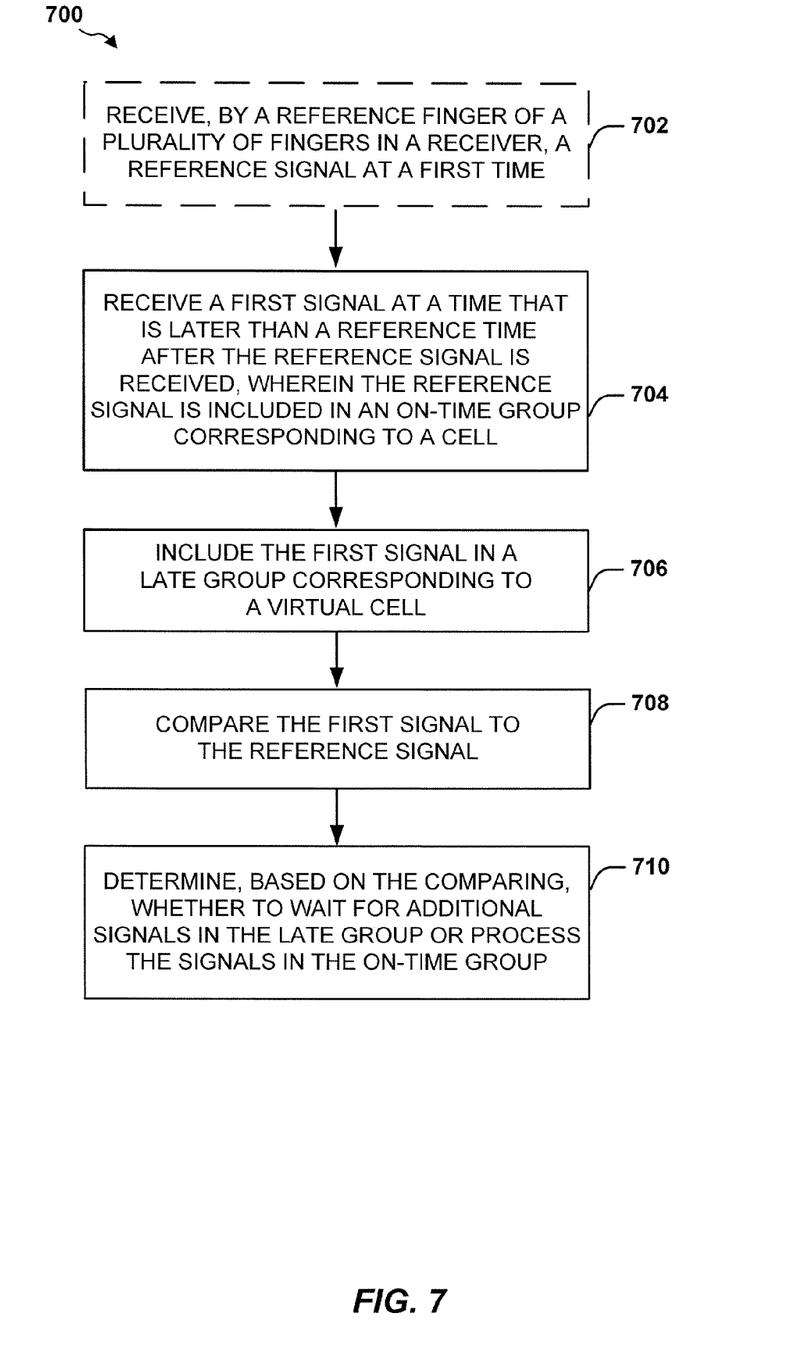
FIG. 7 is a flow chart diagram illustrating an example method for handling fingers with large delay spreads through utility optimization according to the present aspects.

Additionally, he UE 602 may include reception module 604, downlink signal processing module 606 and/or on-time cell module 608 and/or virtual late cell module 610, as well as one or more additional modules, that perform each of the functions described with respect to method 700 of FIG. 7. As such, the functions represented by each block in the method 700 of FIG. 7 may be performed by a respective module and UE 602 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof. Moreover, as noted, UE 602 may be the same as or similar to UE 110 of FIG. 1 and/or UE 250 of FIG. 2.

FIG. 7 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 is a flow chart of a method 700 of handling fingers with large delay spreads through utility optimization according to the present aspects. Aspects of the method 700 may be performed by UE 602 of FIG. 6, which may be the same as or similar to UE 110 of FIG. 1 and/or UE 250 of FIG. 2. More particularly, aspects of method 700 may be performed by reception module 604, downlink signal processing module 606, on-time cell module 608, and/or virtual late cell module 610, all of which are in communication with base station 108 and repeater 109 (both of FIG. 1).

At 702, in an optional aspect, method 700 may include receiving, by a reference finger of a plurality of fingers in a receiver, a reference signal at a first time. For example, the UE 602 may receive a reference signal at a first time. In an aspect, reception module 604 may be configured to receive the reference signal from, e.g., base station 108. In such an aspect, a reference finger of a plurality of fingers in a receiver associated with reception module 604 may receive the reference signal. In an aspect, downlink signal processing module 606 includes on-time cell module 608 configured to include the reference signal in an "on-time" group associated with an on-time cell. In an aspect, the reference signal may include a primary scrambling code (PSC). Further, in an aspect, the reference time may be 228 Cx1 samples. Additional details of receiving a reference signal at a first time are described above with respect to FIGS. 3-6 and 8.

At 704, method 700 may include receiving, through a finger of the plurality of fingers in the receiver, a first signal, wherein the first signal is received at a time that is later than a reference time after a reference signal is received by a reference finger of the plurality of fingers, wherein the reference signal is included in an on-time group corresponding to a cell. For example, the UE 602 may receive a signal at a time that is later than a reference time after the first time. In an aspect, reception module 604 may be configured to receive the first signal. For example, in an aspect, a finger of the plurality of fingers in the receiver associated reception module 604 may receive the first signal from, e.g., repeater 109. In an aspect, the reference time may be 228 Cx1 samples, and thus the first signal may be received after receiving 228 Cx1 samples. Additional details of receiving the first signal at a time later than a reference time at which a reference signal is received are described above with respect to FIGS. 3-6 and 8.

At 706, the method 700 may further perform the action of including the signal in a late group, wherein the late group corresponds to a virtual cell. For example, the UE 602 may include the first signal in a late group corresponding to a virtual cell. In an aspect, downlink signal processing module 606 includes virtual late cell module 610 configured to include the first signal in the late group associated with a virtual late cell, as described in detail above. Additional details of including the first signal in the late group corresponds to the virtual cell are described above with respect to FIGS. 3-6 and 8.

At 708, method 700 may include comparing the first signal to the reference signal. In an aspect, comparing the first signal to the reference signal may include determining a first utility value for the on-time group and a second utility value for the late group over one or more frames. For example, the UE may determine utility values for the on-time cell and the virtual late cell. In such an aspect, the determination may be performed by downlink signal processing module 606, on-time cell module 608, and/or virtual late cell module 610. In an aspect, the utility values are average power values. In such an aspect, the average power values are derived from moving average power values (Pavg) over a previous one or more frames, instantaneous power values (Pinst) and a weighting value (α). Further, the moving average power values may be derived from equation (1).

$$P_{avg\text{-}New} = P_{avg\text{-}old} + \alpha(P_{inst} - P_{avg\text{-}old}) \quad (1)$$

In such an aspect, the weighting value (α) may be ¼. Further, the one or more frames may be 32 frames. Further, Pinst may be determined from total finger received signal strength indicator (RSSI). Additional details of determining a first utility value for the on-time group and a utility power value for the late group over one or more frames are described above with respect to FIGS. 3-6 and 8.

At 710, method 700 may include determining, based on the comparing, whether to wait for additional signals in the late group or process the signals in the on-time group. In an aspect, determining whether to wait for additional signals in the late group or process the signals in the on-time group may include processing signals in the late group (e.g., received from the virtual cell) and signals in the on-time group (e.g., received from the reference cell) upon the determination that the first utility value is not greater than or equal to the second utility value.

For example, it may not be possible to combine the energy of signals from the on-time group with the energy of signals from the late group due to, for instance, timing constraints related to power control. In other words, there may be a tradeoff between any benefits of combining signals from the late group with signals from the on-time group and the delay (or latency) that would be needed to do so (e.g., any delay needed to wait for the additional signals in the late group). In one example, if the signals in the on-time group are processed without waiting for, and combining, signals in the late group, a smaller feedback or overall delay may be achieved, but at the expense of any additional benefit received by using the signals in the late group. In another example, processing signals in the late group may lead to an increase in energy that may be used for processing the signals (and, as such, may lead to more accurate processing), but at the expense of a larger feedback delay. As such, the determination as to whether to wait for additional signals in the late group or process the signals in the on-time group (e.g., without combining with the signals in the late group) may be made based on the tradeoff. More particularly, utilities, which may be a function of delay and energy, for the late group and for the on-time group may be compared to determine how the tradeoff is best made in any particular scenario.

For example, the UE 602 may switch to the late group upon a determination that late group power value is greater than the on-time group power value. In other words, UE 602 may determine to wait for additional signals in the late group before processing the signals. In such an aspect, the determination may be performed by downlink signal processing module 606, on-time cell module 608, and/or virtual late cell module 610, as described in detail above. As used herein, the power value may be based on finger energy, a received signal strength indicator (RSSI), signal to noise ratio (SNR) from RSSI, and/or the like. Additional details of determining whether the first utility value is greater than or equal to the second utility value, and switching to the virtual cell (e.g., waiting for additional signals in the late group) upon the determination that the first utility value is not greater than or equal to the second utility value are described above with respect to FIGS. 3-6 and 8.

Figure 8:
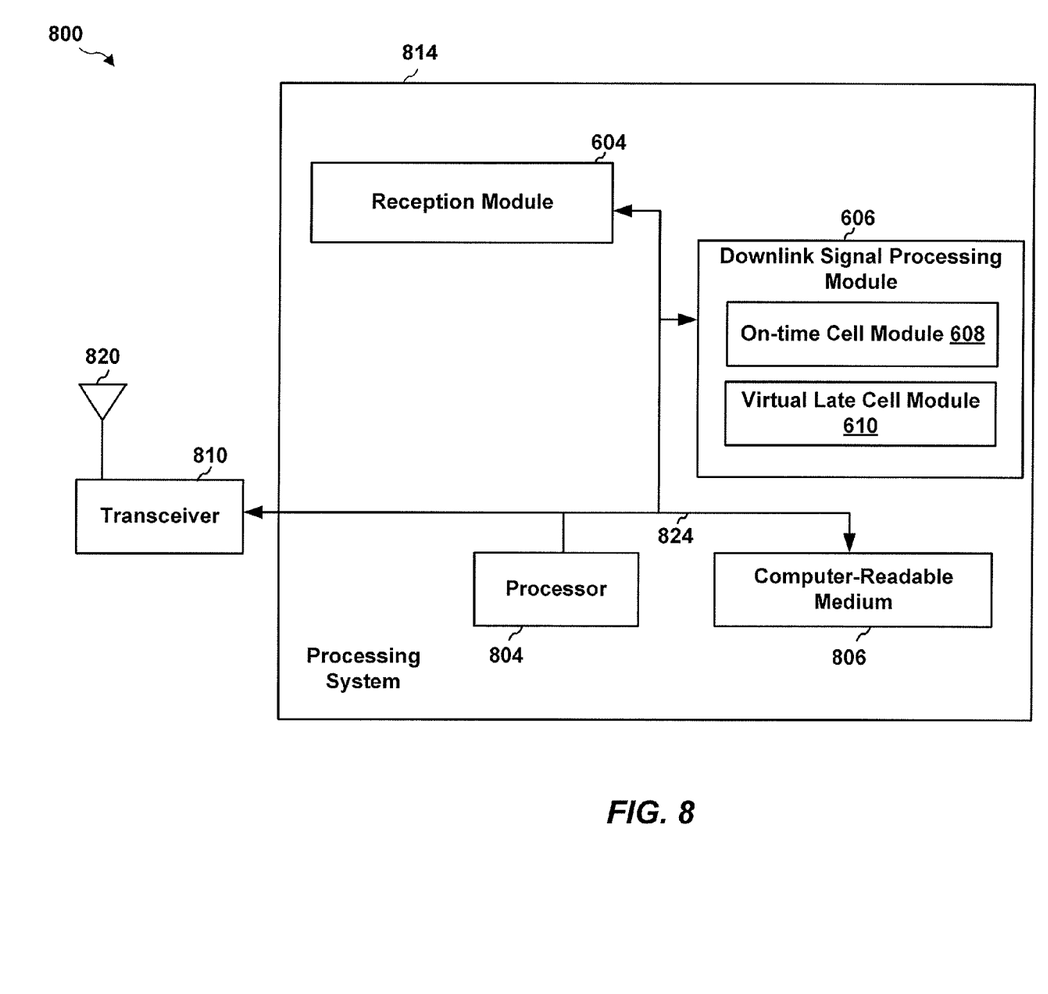
FIG. 8 is a diagram illustrating an example of a hardware implementation for an apparatus employing a processing system and having aspects configured to handle fingers with large delay spreads through utility optimization according to the present aspects.

FIG. 8 is a diagram illustrating an example of a hardware implementation for an apparatus 800 employing a processing system 814 and having aspects configured for handling fingers with large delay spreads through utility optimization according to the present aspects. In an aspect, apparatus 800 may be UE 602 of FIG. 6. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, reception module 604, downlink signal processing module 606, on-time cell module 608, and virtual late cell module 610, all included within UE 602 of FIG. 6, and the computer-readable medium 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium.

The processing system 814 includes a processor 804 coupled to a computer-readable medium 806. The processor 804, which may be one processor or multiple processors, is responsible for general processing, including the execution of software stored on the computer-readable medium 806. The software, when executed by the processor 804, causes the processing system 814 to perform the various functions described supra for any particular apparatus. More particularly, and as described above with respect to FIG. 6, reception module 604, downlink signal processing module 606, on-time cell module 608, and/or virtual late cell module 610 may be software components (e.g., software modules), such that the functionality described with respect to each of the modules may be performed by processor 804.

The computer-readable medium 806 may also be used for storing data that is manipulated by the processor 804 when executing software, such as, for example, software modules represented by reception module 604, downlink signal processing module 606, on-time cell module 608, and virtual late cell module 610. In one example, the software modules (e.g., any algorithms or functions that may be executed by processor 804 to perform the described functionality) and/or data used therewith (e.g., inputs, parameters, variables, and/or the like) may be retrieved from computer-readable medium 806.

More particularly, the processing system further includes at least one of reception module 604, downlink signal processing module 606, on-time cell module 608, and virtual late cell module 610. The modules may be software modules running in the processor 804, resident/stored in the computer-readable medium 806, one or more hardware modules coupled to the processor 804, or some combination thereof.

In an aspect where UE 602 of FIG. 2 is UE 250 of FIG. 2, the processing system 814 may be a component of the UE 250 and may include the memory 260 and/or at least one of the TX processor 268, the RX processor 256, and the controller/processor 259.

In one configuration, the apparatus 800 having aspects configured for handling fingers with large delay spreads through utility optimization includes means for receiving, through a finger of a plurality of fingers in a receiver, a first signal, and means for including the first signal in a late group corresponding to a virtual cell. In an aspect, the first signal may be received at a time that is later than a reference time after a reference signal is received by a reference finger of the plurality of fingers. In an aspect, apparatus 800 may provide means for comparing the first signal to the reference signal by, in an aspect, determining a first utility (e.g., power) value for the on-time group and a second utility (e.g., power) value for the late group over one or more frames and determining whether the first utility value is greater than or equal to the second utility value. In an aspect, apparatus 800 may provide means for determining whether to wait for additional signals in the late group or process the signals in the on-time group based on the comparing by, in an aspect, processing signals in the late group and signals in the on-time group upon the determination that the first utility value is not greater than or equal to the second utility value. The aforementioned means may be one or more of the aforementioned modules of the UE 602 and/or the processing system 814 of the apparatus 800 configured to perform the functions recited by the aforementioned means. As described supra, the processing system 814 may include the TX Processor 268, the RX Processor 256, and the controller/processor 259. As such, in one configuration, the aforementioned means may be the TX Processor 268, the RX Processor 256, and the controller/processor 259 configured to perform the functions recited by the aforementioned means.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising:
receiving, through a finger of a plurality of fingers in a receiver, a first signal, wherein the first signal is received at a time that is later than a reference time after a reference signal is received by a reference finger of the plurality of fingers, wherein the reference signal is included in an on-time group corresponding to a cell;
including the first signal in a late group corresponding to a virtual cell;
comparing the first signal to the reference signal, wherein the comparing further comprises:
determining a first utility value for the on-time group and a second utility value for the late group over one or more frames, and
determining whether the first utility value is greater than or equal to the second utility value; and
determining, based on the comparing, whether to wait for additional signals in the late group or process the signals in the on-time group.

2. The method of claim 1,
wherein the determining whether to wait for the additional signals in the late group or process the signals in the on-time group further comprises processing signals in the late group and signals in the on-time group upon the determination that the first utility value is not greater than or equal to the second utility value.

3. The method of claim 1, wherein the first utility value and the second utility value comprise average power values.

4. The method of claim 3, wherein the average power values are derived from moving average power values (Pavg) over a previous one or more frames, instantaneous power values (Pinst) and a weighting value ($\alpha$).

5. The method of claim 4, wherein the moving average power values are derived from $P_{avg-New}=P_{avg-old}+\alpha(P_{inst}-P_{avg-old})$.

6. The method of claim 1, wherein the reference signal comprises a primary scrambling code.

7. The method of claim 1, wherein the reference signal is received from a base station, and wherein the first signal is received from a repeater.

8. A non-transitory computer-readable medium for wireless communication comprising code that, when executed by a processor or processing system included within a user equipment, causes the user equipment to:
receive, through a finger of a plurality of fingers in a receiver, a first signal, wherein the first signal is received at a time that is later than a reference time after a reference signal is received by a reference finger of the plurality of fingers, wherein the reference signal is included in an on-time group corresponding to a cell;
include the first signal in a late group corresponding to a virtual cell;
compare the first signal to the reference signal, wherein the code causing the user equipment to compare further comprises code causing the user equipment to:
determine a first utility value for the on-time group and a second utility value for the late group over one or more frames, and
determine whether the first utility value is greater than or equal to the second utility value; and
determine, based on the comparison, whether to wait for additional signals in the late group or process the signals in the on-time group.

9. The computer-readable medium of claim 8,
wherein the code causing the user equipment to determine whether to wait for the additional signals in the late group or process the signals in the on-time group further comprises code causing the user equipment to process signals in the late group and signals in the on-time group upon the determination that the first utility value is not greater than or equal to the second utility value.

10. The computer-readable medium of claim 8, wherein the first utility value and the second utility value comprise average power values.

11. The computer-readable medium of claim 10, wherein the average power values are derived from moving average power values (Pavg) over a previous one or more frames, instantaneous power values (Pinst) and a weighting value ($\alpha$).

12. The computer-readable medium of claim 11, wherein the moving average power values are derived from $P_{avg-New}=P_{avg-old}+\alpha(P_{inst}-P_{avg-old})$.

13. The computer-readable medium of claim 8, wherein the reference signal comprises a primary scrambling code.

14. The computer-readable medium of claim 8, wherein the reference signal is received from a base station, and wherein the first signal is received from a repeater.

15. An apparatus for wireless communication, comprising:
means for receiving, through a finger of a plurality of fingers in a receiver, a first signal, wherein the first signal is received at a time that is later than a reference time after a reference signal is received by a reference finger of the plurality of fingers, wherein the reference signal is included in an on-time group corresponding to a cell;
means for including the first signal in a late group corresponding to a virtual cell;
means for comparing the first signal to the reference signal, wherein the means for comparing further comprises:
means for determining a first utility value for the on-time group and a second utility value for the late group over one or more frames, and
means for determining whether the first utility value is greater than or equal to the second utility value; and
means for determining, based on the comparing, whether to wait for additional signals in the late group or process the signals in the on-time group.

16. The apparatus of claim 15,
wherein the means for determining whether to wait for the additional signals in the late group or process the signals in the on-time group further comprises means for processing signals in the late group and signals in the on-time group upon the determination that the first utility value is not greater than or equal to the second utility value.

17. The apparatus of claim 15, wherein the first utility value and the second utility value comprise average power values.

18. The apparatus of claim 17, wherein the average power values are derived from moving average power values (Pavg) over a previous one or more frames, instantaneous power values (Pinst) and a weighting value ($\alpha$).

19. The apparatus of claim 18, wherein the moving average power values are derived from $P_{avg-New}=P_{avg-old}+\alpha(P_{inst}-P_{avg-old})$.

20. The apparatus of claim 15, wherein the reference signal comprises a primary scrambling code.

21. The apparatus of claim 15, wherein the reference signal is received from a base station, and wherein the first signal is received from a repeater.

22. An apparatus for wireless communication, comprising:
a reception module configured to receive, through a finger of a plurality of fingers in a receiver, a first signal, wherein the first signal is received at a time that is later than a reference time after a reference signal is received by a reference finger of the plurality of fingers and the reference signal is included in an on-time group corresponding to a cell; and a downlink signal processing module configured to:
include the first signal in a late group corresponding to a virtual cell,
compare the first signal to the reference signal, comprising the downlink signal processing module further configured to:
determine a first utility value for the on-time group and a second utility value for the late group over one or more frames, and
determine whether the first utility value is greater than or equal to the second utility value, and
determine, based on the comparison, whether to wait for additional signals in the late group or process the signals in the on-time group.

23. The apparatus of claim 22, wherein the downlink signal processing module being configured to determine whether to wait for the additional signals in the late group or process the signals in the on-time group comprises the downlink signal processing module further configured to process signals in the late group and signals in the on-time group upon the determination that the first utility value is not greater than or equal to the second utility value.

24. The apparatus of claim 22, wherein the downlink signal processing module being configured to determine the first utility value and the second utility value comprises the downlink signal processing module configured to determine average power values.

25. The apparatus of claim 24, wherein the downlink signal processing module being configured to determine the average power values comprises the downlink signal processing module configured to derive the average power values from moving average power values (Pavg) over a previous one or more frames, instantaneous power values (Pinst) and a weighting value ($\alpha$).

26. The apparatus of claim 25, wherein the downlink signal processing module being configured to derive the moving average power values comprises the downlink signal processing module configured to derive the moving average power values from $P_{avg-New} = P_{avg-old} + \alpha(P_{inst} - P_{avg-old})$.

27. The apparatus of claim 22, wherein the reference signal comprises a primary scrambling code (PSC).

28. The apparatus of claim 22, wherein the reference signal is received from a base station, and wherein the first signal is received from a repeater.

* * * * *